(12) United States Patent
Lee et al.

(10) Patent No.: US 9,684,222 B2
(45) Date of Patent: Jun. 20, 2017

(54) OPTICAL WAVEGUIDE AND OPTICAL DEVICE BASED ON THE SAME

(71) Applicant: ELECTRONICS AND TELECOMMUNICATIONS RESEARCH INSTITUTE, Daejeon (KR)

(72) Inventors: Jong Moo Lee, Sejong (KR); Min Su Kim, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 0 days.

(21) Appl. No.: 15/188,976

(22) Filed: Jun. 21, 2016

(65) Prior Publication Data
US 2016/0299403 A1     Oct. 13, 2016

Related U.S. Application Data

(62) Division of application No. 14/590,296, filed on Jan. 6, 2015, now Pat. No. 9,400,402.

(30) Foreign Application Priority Data

Jan. 7, 2014   (KR) ................... 10-2014-0001917
Jul. 10, 2014  (KR) ................... 10-2014-0086779

(51) Int. Cl.
*G02F 1/225*     (2006.01)
*G02F 1/025*     (2006.01)
(Continued)

(52) U.S. Cl.
CPC ............ *G02F 1/2257* (2013.01); *G02F 1/011* (2013.01); *G02F 1/0147* (2013.01); *G02F 1/025* (2013.01);
(Continued)

(58) Field of Classification Search
CPC ...... G02F 1/2257; G02F 1/025; G02F 1/0147; G02F 1/225; G02F 1/011
See application file for complete search history.

(56) References Cited

U.S. PATENT DOCUMENTS 6,240,226 B1 *   5/2001  Presby .................. G02F 1/3136
                                                            385/145
6,411,752 B1     6/2002  Little et al.
(Continued)

FOREIGN PATENT DOCUMENTS

KR   2002-0024544 A   3/2002
KR   2002-0070489 A   9/2002
(Continued)

OTHER PUBLICATIONS

Jong-Moo Lee et al., "Temperature Dependence of Silicon Nanophotonic Ring Resonator With a Polymeric Overlayer", Journal of Lightwave Technology, vol. 25, No. 8, pp. 2236-2243, Aug. 2007.
(Continued)

*Primary Examiner* — Ryan Lepisto
(74) *Attorney, Agent, or Firm* — Rabin & Berdo, P.C.

(57) ABSTRACT

Disclosed is a technology related to an optical waveguide which is insensitive to an ambient temperature and is capable of adjusting a wavelength error due to a manufacturing processing deviation. The optical waveguide includes: a clad layer positioned on a substrate; a core layer positioned between the substrate and the clad layer, and including patterns positioned in a first region and a second region; and a wavelength adjusting unit positioned in the first region between the substrate and the clad layer, and configured to adjust a wavelength of an optical signal propagated through patterns passing through the first region based on received electric energy, in which the clad layer
(Continued)

includes a material having a Thermo-Optic Coefficient (TOC) with an opposite sign to that of a material included in the core layer.

5 Claims, 6 Drawing Sheets

(51) Int. Cl.
  *G02F 1/01* (2006.01)
  *G02B 6/12* (2006.01)
  *G02F 1/21* (2006.01)
  *G02B 6/122* (2006.01)

(52) U.S. Cl.
  CPC .............. *G02F 1/225* (2013.01); *G02B 6/122* (2013.01); *G02B 2006/12061* (2013.01); *G02B 2006/12142* (2013.01); *G02F 2001/212* (2013.01); *G02F 2202/105* (2013.01); *G02F 2203/04* (2013.01); *G02F 2203/21* (2013.01); *G02F 2203/60* (2013.01)

(56) References Cited

U.S. PATENT DOCUMENTS

| | | | |
|---|---|---|---|
| 6,618,539 B2 | 9/2003 | Hirose et al. | |
| 6,636,668 B1 | 10/2003 | Al-hemyari et al. | |
| 6,795,631 B2 | 9/2004 | Noro et al. | |
| 7,035,491 B2 * | 4/2006 | Little | G02B 6/126 385/11 |
| 7,248,765 B2 | 7/2007 | Lee et al. | |
| 7,693,384 B2 | 4/2010 | Lee et al. | |
| 7,760,974 B2 | 7/2010 | Lee et al. | |
| 7,848,599 B2 | 12/2010 | Cunningham et al. | |
| 2003/0180030 A1 | 9/2003 | Hirose et al. | |
| 2012/0243828 A1 | 9/2012 | Suzuki | |

FOREIGN PATENT DOCUMENTS

| | | |
|---|---|---|
| KR | 2002-0092209 A | 12/2002 |
| KR | 10-0687742 B1 | 2/2007 |

OTHER PUBLICATIONS

Jong-Moo Lee et al., "Controlling temperature dependence of silicon waveguide using slot structure", Optics Express, vol. 16, Issue 3, pp. 1645-1652, Feb. 4, 2008.

John E. Cunningham et al., "Highly-efficient thermally-tuned resonant filters", 2010 IEEE Photonics Society Summer Topical Meeting Series, pp. 217-218, Jul. 19-21, 2010.

Po Dong et al., "Low power and compact reconfigurable multiplexing devices based on silicon microring resonators", Optic Express, vol. 18, No. 10, pp. 9852-9858, May 10, 2010.

Po Dong et al., "Thermally tunable silicon racetrack resonators with ultralow tuning power", Optic Express, vol. 18, No. 19, pp. 20298-20304, Sep. 13, 2010.

Biswajeet Guha et al., "Minimizing temperature sensitivity of silicon Mach-Zehnder interferometers", Optics Express, vol. 18, No. 3, pp. 1879-1887, Feb. 1, 2010.

Adil Masood et al., "Comparison of heater architectures for thermal control of silicon photonic circuits", 2013 IEEE 10th International Conference on Group IV Photonics (GFP), pp. 83-84, Aug. 28-30, 2013.

Xuezhe Zheng et al., "1×8 Si ring Mux/DeMux with ultra-low tuning power", 2013 IEEE 10th International Conference on Group IV Photonics (GFP), pp. 23-24, Aug. 28-30, 2013.

* cited by examiner

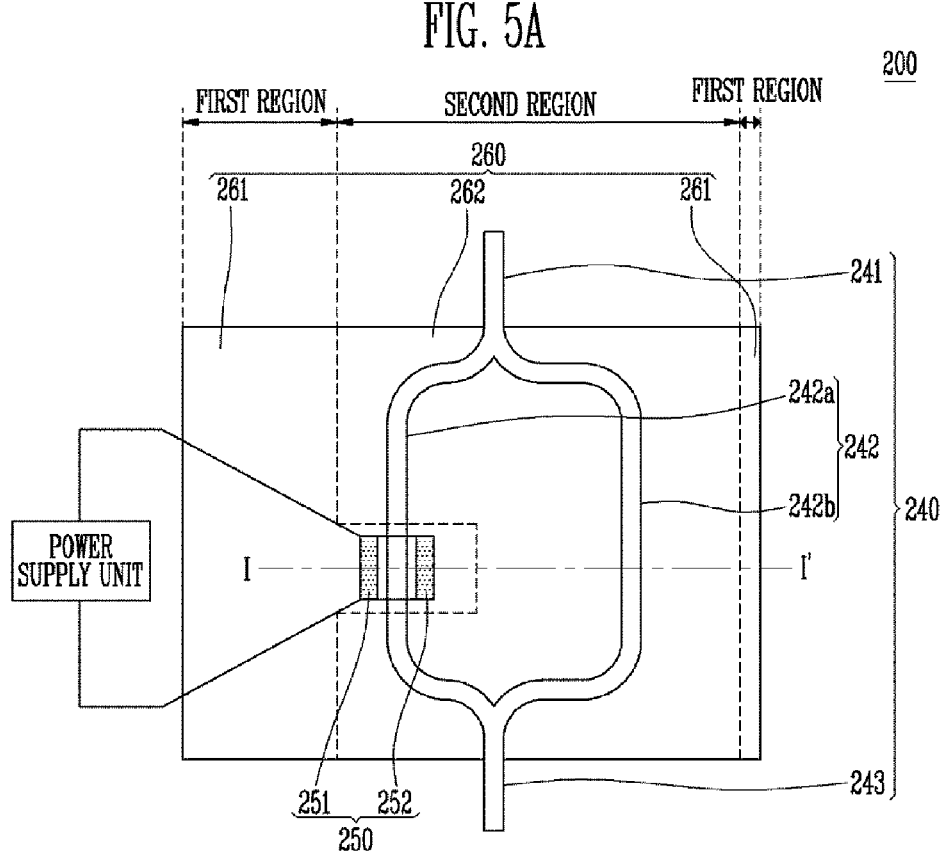
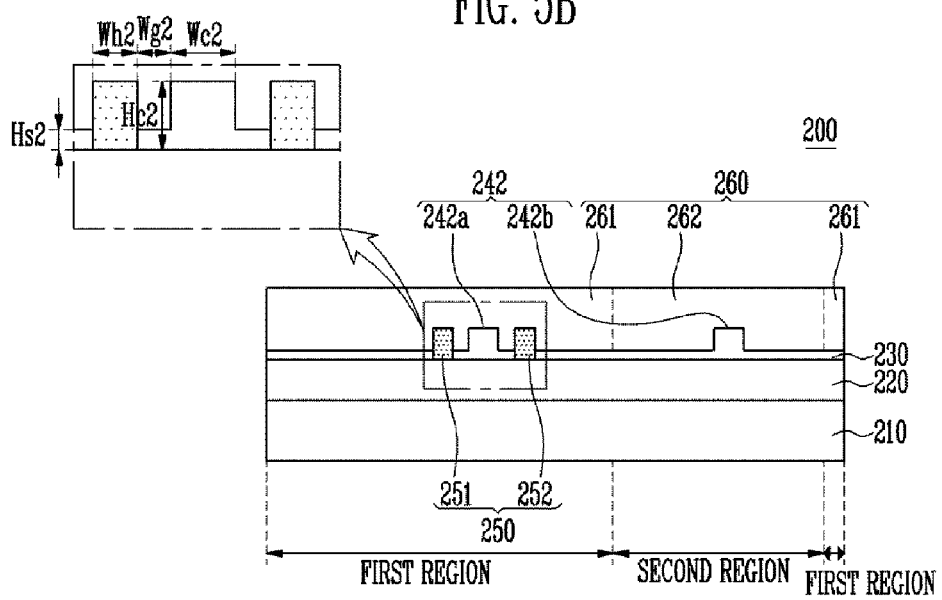

OPTICAL WAVEGUIDE AND OPTICAL DEVICE BASED ON THE SAME

CROSS-REFERENCE TO RELATED APPLICATIONS

This is a division of application Ser. No. 14/590,296, filed Jan. 6, 2015. Further, the present application claims priority to Korean patent application numbers 10-2014-0001917, filed on Jan. 7, 2014 and 10-2014-0086779, filed on Jul. 10, 2014. The disclosures of these prior US and Korean applications are incorporated herein by reference.

BACKGROUND

1. Field

The present invention relates to an optical device, and more particularly, to an optical waveguide and an optical device based on the same.

2. Discussion of Related Art

Signal transmission through electrical connection has a problem in that as a transmission rate is increased, loss and distortion for the signal are increased. Accordingly, in order to solve the aforementioned problem, an optical interconnection technology using an optical signal has recently attracted attentions.

The optical waveguide is a core technology among base technologies necessary for implementing an optical connection technique, and an optical waveguide using a silicon material has been recently implemented.

The optical waveguide implemented by using a silicon material may be manufactured to have a micro scale or smaller through a high refractive index of the silicon material, may be mass-produced through a Complementary Metal-Oxide Semiconductor (CMOS) processing technology, and may be integrated with an existing electronic device.

However, the optical waveguide implemented by using the silicon material always has Temperature-Dependent Wavelength Shift (TDWS), in which a center wavelength moves about 80 pm/° C. according to a change in a temperature, by a high Thermo-Optic Coefficient (TOC) of the silicon material, so that there is a problem in that the optical waveguide exhibits a sensitive wavelength characteristic change.

Further, since the optical waveguide implemented by using the silicon material always has a manufacturing process deviation of about 1 nm, there is a problem in that a different wavelength characteristic from that of a design is exhibited due to the manufacturing process deviation.

SUMMARY

The present invention has been made in an effort to provide an optical waveguide which is insensitive to an ambient temperature, and is capable of adjusting a wavelength error due to a manufacturing processing deviation.

Further, the present invention has been made in an effort to provide an optical device based on an optical waveguide which is insensitive to an ambient temperature, and is capable of adjusting a wavelength error due to a manufacturing processing deviation.

An exemplary embodiment of the present invention provides an optical waveguide, including: a clad layer positioned on a substrate; a core layer positioned between the substrate and the clad layer, and including patterns positioned in a first region and a second region; and a wavelength adjusting unit positioned in the first region between the substrate and the clad layer, and configured to adjust a wavelength of an optical signal propagated through patterns passing through the first region based on received electric energy, in which the clad layer includes a material having a Thermo-Optic Coefficient (TOC) with an opposite sign to that of a material included in the core layer.

The core layer may include a silicon material having a positive TOC.

The clad layer may include: a first clad layer positioned in the first region, and including a material having a smaller TOC than that of the silicon material included in the core layer; and a second clad layer positioned in the second region and including a material having a negative TOC.

The first region may be smaller than the second region.

The wavelength adjusting unit may generate heat based on the received electric energy, and provides the generated heat to the patterns passing through the first region to adjust a wavelength of an optical signal propagated through the patterns passing through the first region.

The optical waveguide may further include a slab waveguide positioned between the substrate and the core layer.

The optical waveguide may be used in an optical device based on the optical waveguide.

Another exemplary embodiment of the present invention provides an optical device based on an optical waveguide, including; a substrate; and a ring resonator positioned on the substrate, in which the ring resonator may include: a clad layer positioned on the substrate; a core layer positioned between the substrate and the clad layer, and including at least one ring waveguide positioned in a first region and a second region; and a wavelength adjusting unit positioned in the first region between the substrate and the clad layer, and configured to adjust a wavelength of an optical signal propagated through a ring waveguide passing through the first region based on received electric energy, and the clad layer includes a material having a Thermo-Optic Coefficient (TOC) with an opposite sign to that of a material included in the core layer.

The core layer may include a silicon material having a positive TOC.

The clad layer may include: a first clad layer positioned in the first region, and including a material having a smaller TOC than that of the silicon material included in the core layer; and a second clad layer positioned in the second region and including a material having a negative TOC.

The first region may be smaller than the second region.

The wavelength adjusting unit may generate heat based on the received electric energy, and provides the generated heat to the ring waveguide passing through the first region to adjust a wavelength of an optical signal propagated through the ring waveguide passing through the first region.

The ring resonator may further include a slab waveguide positioned between the substrate and the core layer.

Yet another exemplary embodiment of the present invention provides an optical device based on an optical waveguide, including: a substrate; and a Mach-Zehnder Interferometer (MZI) positioned on the substrate, in which the MZI includes: a clad layer positioned on the substrate; a core layer positioned between the substrate and the clad layer, and including a plurality of arm waveguides positioned in a first region and a second region; and a wavelength adjusting unit positioned in the first region between the substrate and the clad layer, and configured to adjust a wavelength of an optical signal propagated through the plurality of arm waveguides passing through the first region based on received electric energy, and the clad layer includes at least one of a material having a TOC with an opposite sign to that of a material included in the core layer, and a material having a smaller TOC than that of the material included in the core layer.

The core layer may include a silicon material having a positive TOC.

The clad layer may include: a first clad layer positioned in the first region, and including a material having a smaller TOC than that of the silicon material included in the core layer; and a second clad layer positioned in the second region and including a material having a negative TOC.

The first region may be smaller than the second region.

The wavelength adjusting unit may generate heat based on the received electric energy, and provides the generated heat to the plurality of arm waveguides passing through the first region to adjust a wavelength of an optical signal propagated through the plurality of arm waveguides passing through the first region.

The MZI may further include a slab waveguide positioned between the substrate and the core layer.

When the clad layer may include a material having a smaller TOC than that of a material included in the core layer, widths of the plurality of arm waveguides passing through the first region are different from widths of the plurality of arm waveguides positioned the second region.

In the optical waveguide according to the exemplary embodiments of the present invention, TDWS is adjusted by the clad layer, so that it is generally exhibited a wavelength characteristic insensitive to an ambient temperature, and it is possible to minimize power consumption by the wavelength adjusting unit positioned in a local region, thereby finely adjusting a wavelength error due to a manufacturing processing error.

That is, a material capable of offsetting a TOC of the core layer, that is, a material having a negative TOC when the core layer is a silicon material, is clad, so that it is possible to maintain a wavelength characteristic regardless to an ambient temperature, and it is possible to easily adjust a wavelength error due to a manufacturing processing error through the wavelength adjusting unit formed in a local area.

That is, it is possible to minimize power consumption by minimally performing thermo-optic tuning through the wavelength adjusting unit.

Further, the optical waveguide according to the exemplary embodiments of the present invention may be used in an optical device based on an optical waveguide.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The above and other features and advantages of the present invention will become more apparent to those of ordinary skill in the art by describing in detail embodiments thereof with reference to the attached drawings in which:

FIGS. 5A, 5B, 6A and 6B are diagrams illustrating a Mach-Zehnder Interferometer (MZI) among optical devices based on the optical waveguide according to the exemplary embodiment of the present invention.

DETAILED DESCRIPTION

Figure 1:
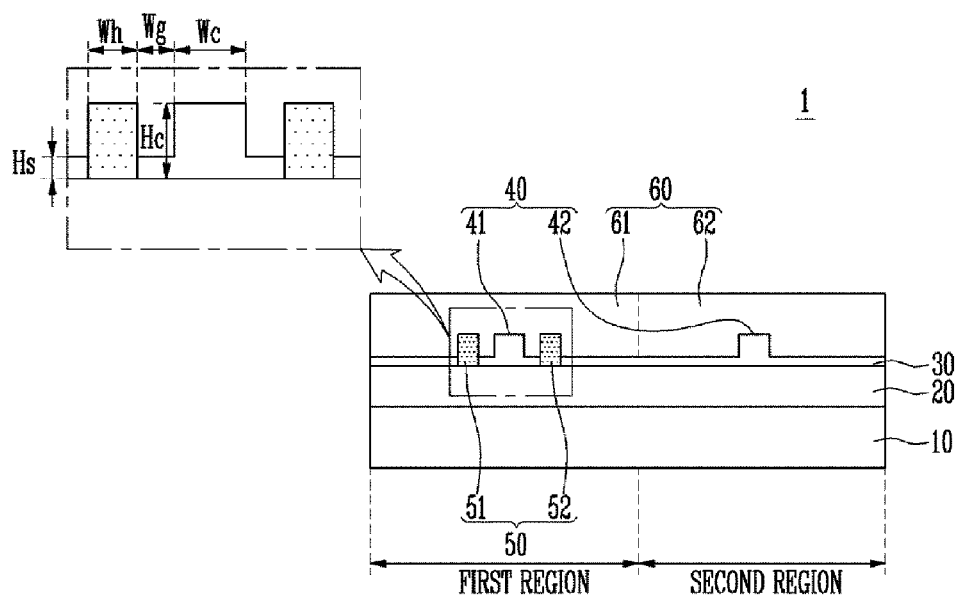
FIG. 1 is a cross-sectional view illustrating an optical waveguide according to an exemplary embodiment of the present invention.

Hereinafter, the present invention will be described in more detail with reference to drawings to which preferred examples according to the present invention are attached in order to describe the present invention more specifically. As those skilled in the art would realize, the described embodiments may be modified in various different ways, all without departing from the spirit or scope of the present invention.

It will be understood that when a layer is referred to as being "on" another layer or substrate, it can be directly on the other layer or substrate, or intervening them may also be present. Further, in the present specification, directional expressions, such as an upper side, an upper part, and an upper surface, may be understood as a lower side, a lower part, and a lower surface. That is, the spatial and directional expression should be understood as a relative direction, and should not be limitedly understood as an absolute direction. Also, in the present specification, "a first" or "a second" is not intended to particularly limit constituent elements, and should be understood as terms for discriminating the constituent elements from each other.

In the drawings, the thickness of layers, films, panels, regions, etc., are exaggerated for clarity. Like reference numerals principally refer to like elements throughout the specification.

Hereinafter, an optical waveguide according to an exemplary embodiment of the present invention will be described with reference to the accompanying drawings.

FIG. 1 is a cross-sectional view illustrating an optical waveguide according to an exemplary embodiment of the present invention.

Referring to FIG. 1, an optical waveguide 1 according to the exemplary embodiment of the present invention includes a core layer 40, a wavelength adjusting unit 50, and a clad layer 60.

A substrate 10 may include a semiconductor substrate, such as Si, GaAs, GaP, or ImP, or a metal substrate, such as Cu or W. Particularly, the substrate 10 may be a silicon substrate.

A Buried Oxide (BOX) 20 may be further included on the substrate 10. That is, the BOX 20 may be positioned on the substrate 10. Further, the BOX 20 may be a silicon oxide layer.

The core layer 40 may be positioned on the substrate 10. For example, the core layer 40 may be positioned between the substrate 10 and the clad layer 60 to be described below. For another example, the core layer 40 may be positioned between the BOX 20 and the clad layer 60 to be described below.

Further, the core layer 40 may include patterns 41 and 42 positioned in a first region and a second region.

Here, the first region and the second region may have the same size, but are not limited thereto, and may have different sizes.

For example, the first region may be smaller than the second region. For another example, the first region may be a region having a size corresponding to 25% or lower of the size of the entire regions including the first region and the second region.

Here, the patterns 41 and 42 may be optical paths through which an optical signal is propagated. For example, the patterns 41 and 42 may include at least one of a straight shape in which an optical signal is straightly propagated, and a curved shape in which an optical signal is curvedly propagated. For another example, the patterns 41 and 42 may include a tapered shape.

Here, the patterns 41 and 42 may be formed by patterning the core layer 40.

Here, the patterns 41 and 42 may be positioned in the first region and the second region, respectively.

Here, the patterns 41 and 42 may be connected with each other. That is, the patterns 41 and 42 positioned in the first region and the second region may be connected with each other.

Here, the patterns 41 and 42 may have the same shape, the same material, and the same size, but are not limited thereto, and may have different shapes, different materials, and different sizes.

For example, the shapes of the patterns 41 and 42 may include a cross-sectional shape of a quadrangle, a circle, an ellipse, or a polygon. For another example, a material included in the patterns 41 and 42 may include a silicon material. That is, the patterns 41 and 42 may be silicon patterns.

Here, the patterns 41 and 42 may be positioned on the same plane or different planes. For example, when the patterns 41 and 42 are positioned on the same plane, the patterns 41 and 42 may be formed of the same material. For another example, when the patterns 41 and 42 are positioned on different planes, an overlapping region may be present between the patterns 41 and 42.

Here, thicknesses (Hc) and widths (Wc) of the patterns 41 and 42 may be adjusted. For example, the thicknesses (Hc) of the patterns may be 150 nm to 400 nm. For another example, the widths (Wc) of the patterns may be 250 nm to 500 nm. That is, according to the optical waveguide according to the exemplary embodiment of the present invention, Temperature-Dependent Wavelength Shift (TDWS) of the optical waveguide may be reduced by changing the thicknesses and the widths of the patterns. Here, the TDWS may mean a change of a center wavelength according to a temperature.

Further, the core layer 40 may include a silicon material having a positive Thermo-Optic Coefficient (TOC). Accordingly, the patterns 41 and 42 formed by pattering the core layer 40 may be silicon patterns.

Here, the TOC may represent a change in a refractive index according to a temperature.

A slab waveguide 30 may be further included under the core layer 40. For example, the slab waveguide 30 may be positioned between the substrate 10 and the core layer 40. For another example, the slab waveguide 30 may be positioned between the BOX 20 and the core layer 40.

Further, the slab waveguide 30 may be formed to have a wide area than those of the patterns 41 and 42 of the core layer 40. Further, the slab waveguide 30 may include the same material as that included in the core layer 40. For example, the slab waveguide 30 may include a silicon material.

Further, a thickness (Hs) of the slab waveguide 30 may be adjusted. Here, a thickness (Hs) of the slab waveguide 30 may be 1 to 100 nm. That is, according to the optical waveguide according to the exemplary embodiment of the present invention, the TDWS of the optical waveguide may be reduced by changing the thicknesses of the slab waveguide.

The wavelength adjusting unit 50 may be positioned on the substrate 10. For example, the wavelength adjusting unit 50 may be positioned in the first region between the substrate 10 and the clad layer 60 to be described below. For example, the wavelength adjusting unit 50 may be positioned in the first region between the BOX 20 and the clad layer 60 to be described below.

Further, the wavelength adjusting unit 50 may be connected to a power supply unit (not shown) through a conduction line. Further, the wavelength adjusting unit 50 may receive electric energy from the power supply unit (not shown).

Here, the power supply unit (not shown) may be positioned outside the optical waveguide. The power supply unit (not shown) is a device or a circuit supplying electric energy to the wavelength adjusting unit 50 of the optical waveguide, and a particular configuration thereof is not peculiarly limited. Particularly, the electric energy may include a voltage or a current. Further, the power supply unit (not shown) may include converters (a DC-DC converter, a DC-AC converter, an AC-DC converter, or an AC-AC converter) for converting direct-current power to alternating-current power, and generating at least one type of electric energy in accordance with the converted power. Accordingly, the wavelength adjusting unit 50 may receive various types of electric energy through the converters.

Further, the wavelength adjusting unit 50 may adjust a wavelength of an optical signal propagated through the patterns 41 passing through the first region based on the applied electric energy.

Here, the wavelength adjusting unit 50 may adjust a wavelength of an optical signal by using a thermo-optic effect.

That is, the wavelength adjusting unit 50 may generate heat based on the received electric energy, and provides the generated heat to the patterns 41 passing through the first region to adjust a wavelength of an optical signal propagated through the patterns 41 passing through the first region.

For example, the wavelength adjusting unit 50 may include a heater. Here, the heater may include a thin film heater or a micro heater. For another example, the wavelength adjusting unit 50 may include a heating line, a heating plate, or an electrode. For another example, the wavelength adjusting unit 50 is not limited to the aforementioned heater, heating line, heating plate, or electrode, and may include any device or circuit which may generate heat based on received electric energy, and provide the generated heat to the patterns 41 passing through the first region.

Further, the wavelength adjusting unit 50 may include a p-type silicon structure. Here, in the P-type silicon structure, a boron (B) element may be doped with high concentration of $2 \times 10^{19}/cm^3$.

Further, the wavelength adjusting unit 50 may be positioned to be adjacent or connected to the patterns 41 passing through the first region. That is, the wavelength adjusting unit 50 may be positioned to be adjacent or connected to the patterns 41 passing through the first region in up, down, left, and right directions based on the patterns 41 passing through the first region.

For example, the wavelength adjusting unit 50 may be positioned to be adjacent or connected to the patterns 41 passing through the first region on the same plane in up, down, left, and right directions based on the patterns 41 passing through the first region. For another example, the wavelength adjusting unit 50 may be positioned to be adjacent or connected to the patterns 41 passing through the first region on different planes in up and down directions based on the patterns 41 passing through the first region.

Here, when the wavelength adjusting unit 50 is positioned to be adjacent to the patterns 41 passing through the first region, an interval between the wavelength adjusting unit 50 and the patterns 41 passing through the first region may be 400 nm to 1000 nm. That is, in the optical waveguide according to the exemplary embodiment of the present invention, it is possible to adjust a wavelength error due to a manufacturing process deviation of the optical waveguide by changing an interval between the wavelength adjusting unit and the patterns passing through the first region.

Further, as illustrated in the drawing, the wavelength adjusting unit 50 may be configured by two wavelength adjusting units 51 and 52, but the present invention is not limited thereto, and the wavelength adjusting unit 50 may be configured by one or three or more wavelength adjusting units.

Here, the plurality of wavelength adjusting units 51 and 52 may have the same shape, the same material, and the same size, but are not limited thereto, and may have different shapes, different materials, and different sizes. For example, the shapes of the plurality of wavelength adjusting units 51 and 52 may include a cross-sectional shape of a quadrangle, a circle, an ellipse, or a polygon.

Further, a width (Wh) of the wavelength adjusting unit 50 may be adjusted. Here, a width (Wh) of the wavelength adjusting unit 50 may be 300 nm to 3000 nm. That is, in the optical waveguide according to the exemplary embodiment of the present invention, it is possible to adjust a wavelength error due to a manufacturing process deviation of the optical waveguide by changing a width of the wavelength adjusting unit.

The clad layer 60 may be positioned on the substrate 10. That is, the clad layer 60 may cover the slab waveguide 30, the patterns 40, and the wavelength adjusting unit 50 positioned on the substrate 10.

Further, the clad layer 60 may include a material having a TOC with an opposite sign to that of the material included in the core layer 40.

That is, when the core layer 40 includes a material having a positive TOC, the clad layer 60 may include a material having a negative TOC.

Here, the material having the positive TOC may include a silicon material.

Here, the material having the negative TOC may include a polymer material or an inorganic material, of which a refractive index is decreased as a temperature is increased contrary to the silicon material.

For example, the polymer material may include at least one polymer among polymers based on polyimide, polyether, polymethylmethacrylate (PMMA), and acrylate, but is not limited thereto, and any polymer material having a negative TOC may be accepted.

For another example, the inorganic material may include a titanium oxide, but is not limited, and any inorganic material having a negative TOC may be accepted.

Further, the clad layer 60 may include a first clad layer 61 and a second clad layer 62.

The first clad layer 61 may be positioned in the first region on the substrate 10. That is, the first clad layer 61 may cover the slab waveguide 30, the patterns 41, and the wavelength adjusting unit 50 positioned in the first region on the substrate 10.

Further, the first clad layer 61 may include a material having a smaller TOC than that of the material included in the core layer 40.

That is, when the core layer 40 includes a silicon material having a positive TOC, the first clad layer 61 may include a silica material with a smaller TOC than that of the silicon material.

Here, the TOC of the silicon material may be +0.00018/° C.

Here, the TOC of the silica material may be +0.00001/° C.

The second clad layer 62 may be positioned in the second region on the substrate 10. That is, the second clad layer 62 may cover the slab waveguide 30 and the patterns 42 positioned in the second region on the substrate 10.

Further, the second clad layer 62 may include a material with a TOC having an opposite sign to that of the material included in the core layer 40.

That is, when the core layer 40 includes a material having a positive TOC, the second clad layer 62 may include a material having a negative TOC.

For example, when the core layer 40 includes a silicon material having a positive TOC, the second clad layer 62 may include the aforementioned polymer material or inorganic material having a negative TOC.

Here, the TOC of the polymer material or the inorganic material may be −0.00005/° C. to −0.0003° C.

Further, the first clad layer 61 and the second clad layer 62 may have sizes corresponding to the first region and the second region. For example, the first clad layer 61 may be smaller than the second clad layer 62. For another example, the first clad layer 61 may have a size corresponding to 25% or lower of the size of the clad layer 60 including the first clad layer 61 and the second clad layer 62.

As described above, the optical waveguide according to the exemplary embodiment of the present invention include the clad layer having the TOC with an opposite sign to that of the core layer, and the wavelength adjusting unit formed in a local region to adjust a wavelength of an optical signal.

Particularly, in the optical waveguide according to the exemplary embodiment of the present invention, the clad layer is divided into two regions, and most regions are made of a material having the TOC with an opposite sign to that of the core layer, and the remaining local region in which the wavelength adjusting unit is positioned may be made of a material with a smaller TOC than that of the core layer.

Accordingly, the optical waveguide according to the exemplary embodiment of the present invention is clad with a material capable of offsetting the TOC of the core layer, that is, a material having a negative TOC when the core layer is a silicon material, so that it is possible to maintain a wavelength characteristic regardless of an ambient temperature, and to easily adjust a wavelength error due to a manufacturing process deviation through the wavelength adjusting unit formed in the local region.

Further, compared to the structure in the related art, in which a wavelength error due to TDWS and a manufacturing process deviation is adjusted by using heat generated by a heater, so that huge power consumption is generated, in the optical waveguide according to the exemplary embodiment of the present invention, thermo-optic tuning is minimally performed through the wavelength adjusting unit, thereby minimizing power consumption.

Accordingly, in the optical waveguide according to the exemplary embodiment of the present invention, the TDWS is adjusted by the clad layer to exhibit a wavelength characteristic generally insensitive to an ambient temperature, and power consumption is minimized by the wavelength adjusting unit positioned in the local region, thereby finely adjusting a wavelength error due to a manufacturing process deviation.

Further, the optical waveguide according to the exemplary embodiment of the present invention may be used to an optical device based on an optical waveguide.

The optical device based on the optical waveguide may include a passive optical device or an active optical device.

Here, the passive optical device may be a device for changing a path of an optical signal or decreasing an intensity of an optical signal, and connecting an optical fiber and an optical fiber or an optical component. Particularly, the passive optical device may include an optical connector, a coupler, or Wavelength division multiplexing (WDM).

Here, the active optical device may be a device autonomously performing a function, such as amplification or oscillation, through supply of a power source or a light source. Particularly, the active optical device may include an optical transmission and optical reception module, a photo diode, a laser diode, an optical amplifier, or a modulator.

Further, the optical device based on the optical waveguide may include a ring resonator, a Mach-Zehnder Interferometer (MZI), or an array waveguide grating (AWG).

Further, the optical device based on the optical waveguide may include ring resonator-type WDM, grid WDM, or a ring resonator type electro-optic modulator.

Further, the optical device based on the optical waveguide may include a modulator using P-N junction or silicon P-I-N junction.

Hereinafter, an optical device based on an optical waveguide according to the exemplary embodiment of the present invention will be described with reference to the accompanying drawings (FIGS. 2 to 6). Particularly, a part overlapping the optical waveguide according to the exemplary embodiment of the present invention will be omitted for simple description.

FIGS. 2 to 4 are diagrams illustrating a ring resonator among optical devices based on the optical waveguide according to the exemplary embodiment of the present invention.

Referring to FIGS. 2 to 4, a ring resonator 100 among optical devices based on the optical waveguide according to the exemplary embodiment of the present invention may include a core layer 140, a wavelength adjusting unit 150, and a clad layer 160.

A substrate 110, a BOX 120, and a slab waveguide 130 may be understood in association with the substrate 10, the BOX 20, and the slab waveguide 30 of the optical waveguide 1 aforementioned with reference to FIG. 1, respectively, so that a detailed description thereof will be omitted.

The core layer 140 may be positioned on the substrate 110. For example, the core layer 140 may be positioned between the substrate 110 and the clad layer 160. For another example, the core layer 140 may be positioned between the BOX 120 and the clad layer 160.

Further, the core layer 140 may include a bus waveguide 141 and ring waveguides 142 and 143 positioned in a first region and a second region.

Here, the first region and the second region may have the same size, but are not limited thereto, and may have different sizes.

For example, the first region may be smaller than the second region. For another example, the first region may be a region having a size corresponding to 25% or lower of the size of the entire regions including the first region and the second region. For another example, as illustrated in the drawings, when the ring waveguides 142 and 143 have circular shapes having a radius of r, the first region may be a region corresponding to a range of a predetermined center angle (θ). Here, the predetermined center angle (θ) may be an acute angle (0°<θ<90°).

Here, the bus waveguide 141 and the ring waveguides 142 and 143 may be optical paths through which an optical signal is propagated. For example, the bus waveguide 141 may include a straight shape in which an optical signal is straightly propagated as illustrated in the drawing, but is not limited thereto, and include a tapered shape. For another example, the ring waveguides 142 and 143 may have circular shapes having a radius of r as illustrated in the drawing, but are not limited thereto, and include an elliptical shape.

Here, the bus waveguide 141 and the ring waveguides 142 and 143 may be formed by patterning the core layer 140.

Here, as illustrated in the drawings, the bus waveguide 141 and the ring waveguides 142 and 143 may be formed over the first region and the second region.

Here, the bus waveguide 141 may include an input waveguide and an output waveguide, and the ring waveguides 142 and 143 may be spaced apart from the bus waveguide 141 by a predetermined interval as illustrated in the drawing.

Here, the bus waveguide 141 and the ring waveguides 142 and 143 may be positioned on the same plane or different planes. For example, when the bus waveguide 141 and the ring waveguides 142 and 143 are positioned on the same plane, the bus waveguide 141 and the ring waveguides 142 and 143 may be made of the same material. For another example, when the bus waveguide 141 and the ring waveguides 142 and 143 are positioned on different planes, there may be an overlapping region between the bus waveguide 141 and the ring waveguides 142 and 143.

Here, the bus waveguide 141 and the ring waveguides 142 and 143 may include a silicon material. That is, the bus waveguide 141 and the ring waveguides 142 and 143 may have a silicon pattern.

Further, the core layer 140 may include a silicon material having a positive TOC. Accordingly, the bus waveguide 141 and the ring waveguides 142 and 143 formed by patterning the core layer 140 may have a silicon pattern.

Here, the TOC may represent a change in a refractive index according to a temperature.

The wavelength adjusting unit 150 may be positioned on the substrate 110. For example, in the first region between the BOX 120 and the clad layer 160. The wavelength adjusting unit 150 may be positioned in the first region between the substrate 110 and the clad layer 160 to be described below. For example, the wavelength adjusting unit 150 may be positioned.

Further, the wavelength adjusting unit 150 may be connected to a power supply unit through a conduction line as illustrated in the drawing. Further, the wavelength adjusting unit 150 may receive electric energy from the power supply unit.

Here, the power supply unit may be understood in association with the power supply unit (not shown) of the optical waveguide 1 aforementioned with reference to FIG. 1, so that a detailed description thereof will be omitted.

Further, the wavelength adjusting unit 150 may adjust a wavelength of an optical signal propagated through ring waveguides 142-1, 143a-1, and 143b-1 passing through the first region based on the received electric energy.

Particularly, the wavelength adjusting unit 150 may adjust a wavelength of an optical signal by using a thermo-optic effect.

That is, the wavelength adjusting unit 150 may generate heat based on the received electric energy, and provides the generated heat to the ring waveguides 142-1, 143a-1, and 143b-1 passing through the first region to adjust a wavelength of an optical signal propagated through the ring waveguides 142-1, 143a-1, and 143b-1 passing through the first region.

For example, the wavelength adjusting unit 150 may include a heater. Here, the heater may include a thin film heater or a micro heater. For another example, the wavelength adjusting unit 150 may include a heating line, a heating plate, or an electrode. For another example, the wavelength adjusting unit 150 is not limited to the aforementioned heater, heating line, heating plate, or electrode, and may include any device or circuit which may generate heat based on received electric energy, and provide the generated heat to the ring waveguides 142-1, 143a-1, and 143b-1 passing through the first region.

Further, the wavelength adjusting unit 150 may include a p-type silicon structure. Here, in the P-type silicon structure, a boron (B) element may be doped with high concentration of $2 \times 10^{19}/cm^3$.

Further, the wavelength adjusting unit 150 may be positioned to be adjacent or connected to the ring waveguides 142-1, 143a-1, and 143b-1 passing through the first region. That is, the wavelength adjusting unit 150 may be positioned to be adjacent or connected to the ring waveguides 142-1, 143a-1, and 143b-1 passing through the first region in up, down, left, and right directions based on the ring waveguides 142-1, 143a-1, and 143b-1 passing through the first region.

For example, the wavelength adjusting unit 50 may be positioned to be adjacent or connected to the ring waveguides 142-1, 143a-1, and 143b-1 passing through the first region on the same plane in up, down, left, and right directions based on the ring waveguides 142-1, 143a-1, and 143b-1 passing through the first region. For another example, the wavelength adjusting unit 150 may be positioned to be adjacent or connected to the ring waveguides 142-1, 143a-1, and 143b-1 passing through the first region on different planes in up and down directions based on the ring waveguides 142-1, 143a-1, and 143b-1 passing through the first region.

Further, the wavelength adjusting unit 150 may be configured by one wavelength adjusting unit, but the present invention is not limited thereto, and the wavelength adjusting unit 150 may be configured by two or more wavelength adjusting units.

Here, the plurality of wavelength adjusting units 150 may have the same shape, the same material, and the same size, but are not limited thereto, and may have different shapes, different materials, and different sizes. For example, the shapes of the plurality of wavelength adjusting units 150 may include a cross-sectional shape of a quadrangle, a circle, an ellipse, or a polygon.

The clad layer 160 may be positioned on the substrate 110. That is, the clad layer 160 may cover the slab waveguide 130, the bus waveguide 141, the ring waveguides 142 and 143, and the wavelength adjusting unit 150 positioned on the substrate 110.

Further, the clad layer 160 may include a material having a TOC with an opposite sign to that of the material included in the core layer 140.

That is, when the core layer 140 includes a material having a positive TOC, the clad layer 160 may include a material having a negative TOC.

Here, the material having the positive TOC may include a silicon material.

Here, the material having the negative TOC may include a polymer material or an inorganic material, of which a refractive index is decreased as a temperature is increased contrary to the silicon material.

Here, the polymer material and an inorganic material may be understood in association with the polymer material and the inorganic material of the optical waveguide 1 aforementioned with reference to FIG. 1, so that a detailed description thereof will be omitted.

Further, the clad layer 160 may include a first clad layer 161 and a second clad layer 162 as illustrated in the drawing.

The first clad layer 161 may be positioned in the first region on the substrate 110. That is, the first clad layer 161 may cover the slab waveguide 130, the bus waveguide 141, the ring waveguides 142-1, 143a-1, and 143b-1, and the wavelength adjusting unit 150 positioned in the first region.

Further, the first clad layer 161 may include a material having a smaller TOC than that of the material included in the core layer 140.

That is, when the core layer 140 includes a silicon material having a positive TOC, the first clad layer 161 may include a silica material having a smaller TOC than that of the silicon material.

Here, the TOC of the silicon material may be +0.00018/° C.

Here, the TOC of the silica material may be +0.00001/° C.

The second clad layer 162 may be positioned in the second region on the substrate 110. That is, the second clad layer 162 may cover the slab waveguide 130, the bus waveguide 141, and the ring waveguides 142-2, 143a-2, and 143b-2 positioned in the second region.

Further, the second clad layer 162 may include a material having a TOC with an opposite sign to that of the material included in the core layer 140.

That is, when the core layer 140 includes a material having a positive TOC, the second clad layer 162 may include a material having a negative TOC.

For example, when the core layer 140 includes a silicon material having a positive TOC, the second clad layer 162 may include the aforementioned polymer material or inorganic material having a negative TOC.

Here, the TOC of the polymer material or the inorganic material may be −0.00005/° C. to −0.0003° C.

Further, the first clad layer 161 and the second clad layer 162 may have sizes corresponding to the first region and the second region. For example, the first clad layer 161 may be smaller than the second clad layer 162. For another example, the first clad layer 161 may have a size corresponding to 25% or lower of the size of the clad layer 160 including the first clad layer 161 and the second clad layer 162. For another example, as illustrated in the drawings, when the ring waveguides 142 and 143 have circular shapes having a radius of r, the first clad layer 161 may have a size corresponding to a range of a predetermined center angle (θ). Here, the predetermined center angle (θ) may be an acute angle (0°<θ<90°).

Figure 2A:
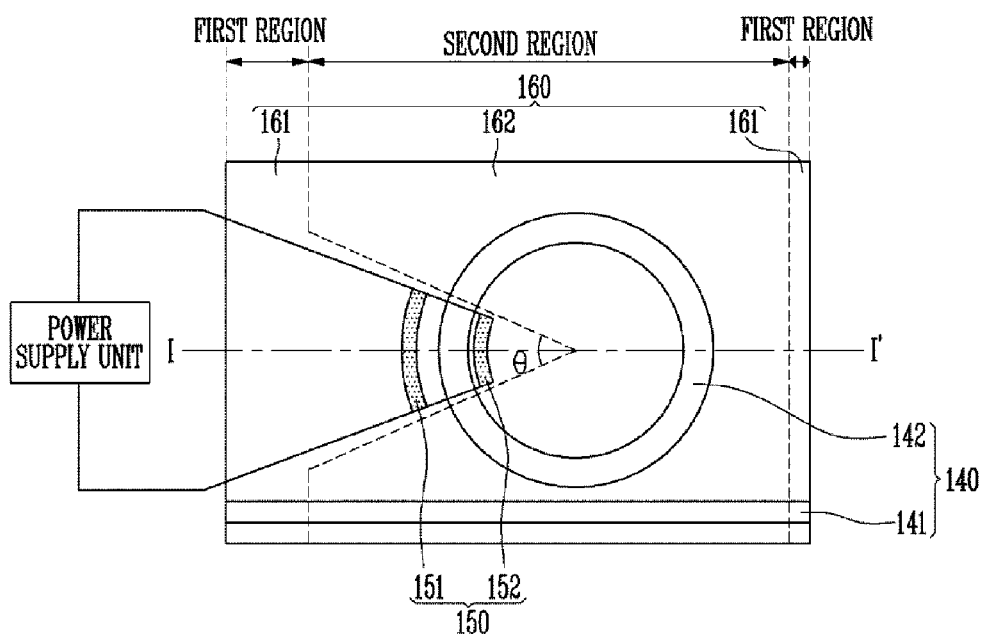
FIGS. 2A, 2B, 3A, 3B, 4A, and 4B are diagrams illustrating a ring resonator among optical devices based on the optical waveguide according to the exemplary embodiment of the present invention.
Figure 2B:
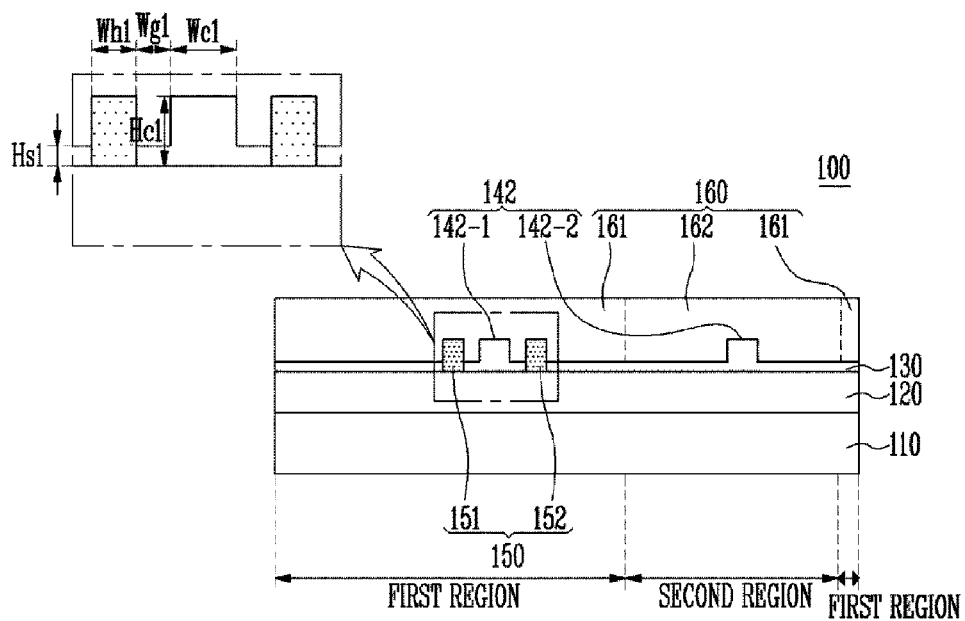

Next, referring to FIGS. 2A and 2B, FIG. 2A is a top plan view illustrating the ring resonator among the optical devices based on the optical waveguide according to the exemplary embodiment of the present invention, and FIG. 2B is a cross-sectional view taken along dotted line I-I' of FIG. 2A.

The ring waveguide 142 is positioned over the first region and the second region, and has a circular shape having a radius of r.

Here, the first region may be a region corresponding to a range of a predetermined center angle (θ), and the predetermined center angle (θ) may be an acute angle (0°<θ<90°).

Here, the second region may be the remaining region except for the first region.

Further, the ring waveguide 142 may be a silicon pattern including a silicon material having a positive TOC.

Further, a thickness (Hc1) of the ring waveguide 142 and a width (Wc1) of the ring waveguide 142 may be adjusted. Here, the thickness (Hc1) of the ring waveguide 142 may be 150 nm to 400 nm. Here, the width (Wc1) of the ring waveguide 142 may be 250 nm to 500 nm. That is, in the ring resonator according to the exemplary embodiment of the present invention, it is possible to reduce TDWS of the ring resonator by changing the thickness and the width of the ring waveguide. Here, the TDWS may mean a change of a center wavelength according to a temperature.

The slab waveguide 130 may be positioned under the ring waveguide 142. Further, the thickness (Hs) of the slab waveguide 130 may be adjusted. Here, the thickness (Hs) of the slab waveguide 130 may be 0 nm to 100 nm. That is, in the ring resonator according to the exemplary embodiment of the present invention, it is possible to reduce TDWS of the ring resonator by changing the thickness of the slab waveguide.

The wavelength adjusting unit 150 may include a heater. The heater may include a first heater 151 and a second heater 152.

Here, the first heater 151 and the second heater 152 may be positioned on the substrate 110. That is, the first heater 151 and the second heater 152 may be positioned in the first region between the BOX 120 and the clad layer 160.

Here, the first heater 151 may be adjacently positioned to the ring waveguide 142-1 passing through the first region on the same plane in a left direction based on the ring waveguide 142-1 passing through the first region.

Here, the second heater 152 may be adjacently positioned to the ring waveguide 142-1 passing through the first region on the same plane in a right direction based on the ring waveguide 142-1 passing through the first region.

Further, an interval (Wg1) between the first heater 151 and the ring waveguide 142-1 passing through the first region and an interval (Wg1) between the second heater 152 and the ring waveguide 142-1 passing through the first region may be adjusted. Here, each of the interval (Wg1) between the first heater 151 and the ring waveguide 142-1 passing through the first region and the interval (Wg1) between the second heater 152 and the ring waveguide 142-1 passing through the first region may be 400 nm to 1000 nm.

Further, a width (Wh1) of the first heater 151 and a width (Wh1) of the second heater 152 may be adjusted. Here, the width (Wh1) of the first heater 151 and the width (Wh1) of the second heater 152 may be 300 nm to 3000 nm.

That is, in the ring resonator according to the exemplary embodiment of the present invention, it is possible to adjust a wavelength error due to a manufacturing process deviation of the ring resonator by changing the interval between the first heater and the ring waveguide passing through the first region, the interval between the second heater and the ring waveguide passing through the first region, the width of the first heater, and the width of the second heater.

Further, the clad layer 160 may include the first clad layer 161 and the second clad layer 162.

Here, the first clad layer 161 has a size corresponding to that of the first region, and may cover the slab waveguide 130, the bus waveguide 141, the ring waveguides 142-1, the first heater 151, and the second heater 152 positioned in the first region on the substrate 110. Further, the first clad layer 161 may include a silica material having a smaller TOC than that of the silicon material.

Here, the second clad layer 162 has a size corresponding to that of the second region, and may cover the slab waveguide 130, the bus waveguide 141, and the ring waveguides 142-2 positioned in the second region on the substrate 110. Further, the second clad layer 162 may include a polymer material or an inorganic material having a negative TOC, in which a refractive index is decreased as a temperature is increased contrary to the silicon material.

Figure 3A:
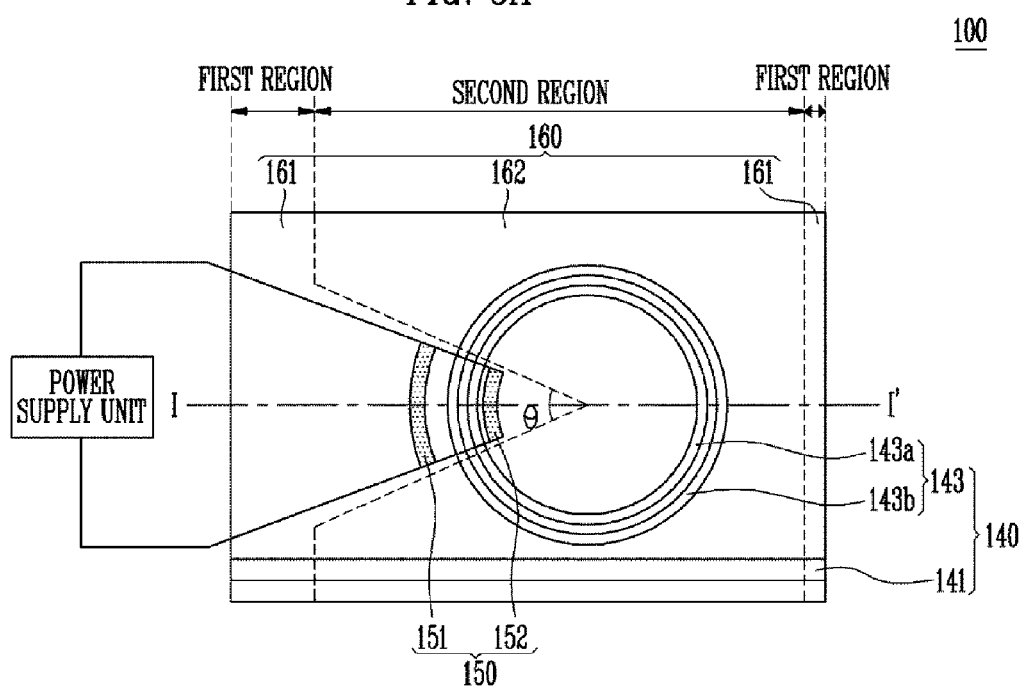
Figure 3B:
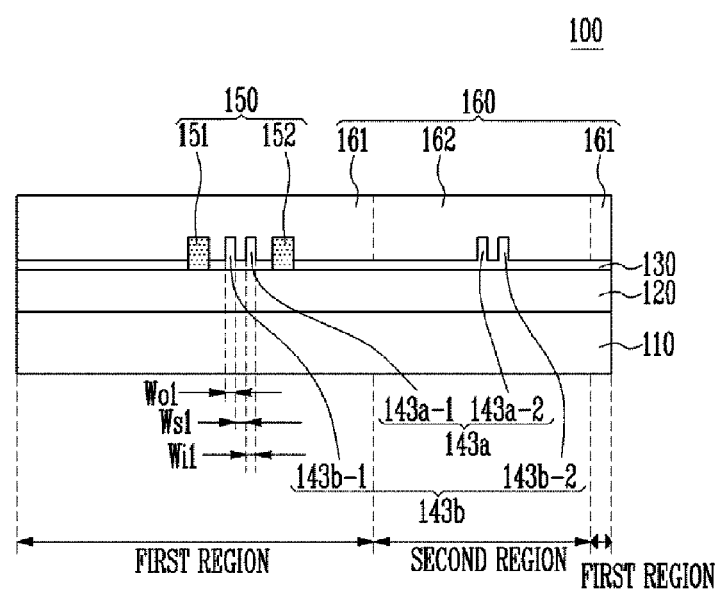

Next, referring to FIGS. 3A and 3B, FIG. 3A is a top plan view illustrating the ring resonator among the optical devices based on the optical waveguide according to the exemplary embodiment of the present invention, and FIG. 3B is a cross-sectional view taken along dotted line I-I' of FIG. 3A.

Contents of FIGS. 3A and 3B are the same as those described with reference to FIGS. 2A and 2B, except for contents to be described below.

The ring waveguide 143 may have a slot waveguide structure. Further, the slot waveguide may include an internal ring waveguide 143a, and at least one external ring waveguide 143b.

Here, the external ring waveguide 143b has a common middle point with the internal ring waveguide 143a, and may be spaced apart from the internal ring waveguide 143a to an outer side so as to have a slot waveguide structure.

Here, a width (Wi1) of the internal ring waveguide 143a, a width (Wo1) of the external ring waveguide 143b, and a slot interval (Ws1) between the internal ring waveguide 143a and the external ring waveguide 143b may be adjusted. Particularly, a sum (Wi1+Wo1) of the width (Wi1) of the internal ring waveguide 143a and the width (Wo1) of the external ring waveguide 143b may be 300 nm to 700 nm.

That is, in the ring resonator according to the exemplary embodiment of the present invention, it is possible to decrease TDWS of the ring resonator by changing the width of the internal ring waveguide, the width of the external ring waveguide, and the slot interval between the internal ring waveguide and the external ring waveguide.

Figure 4A:
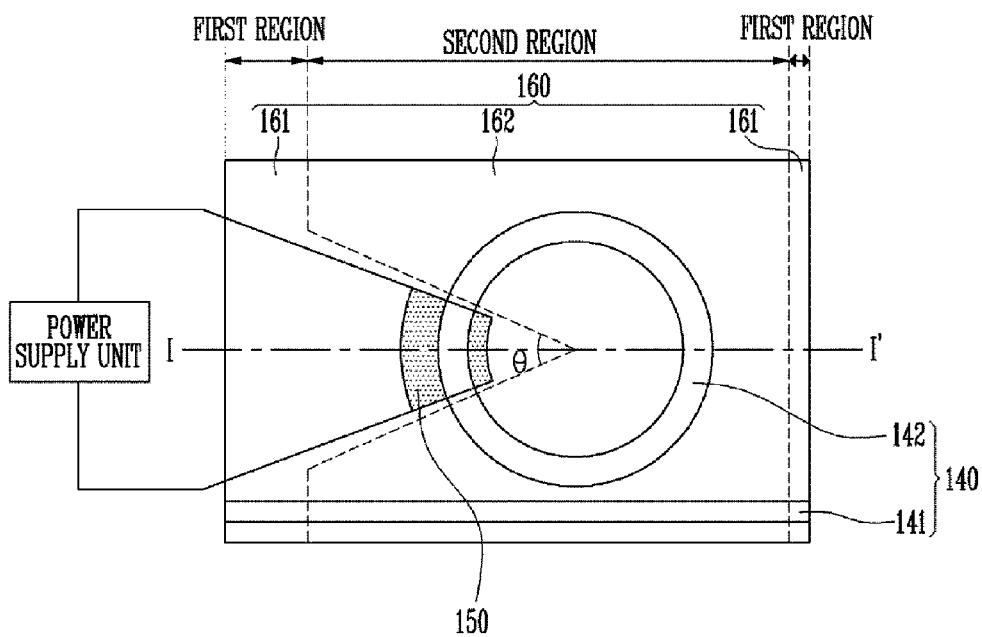
Figure 4B:
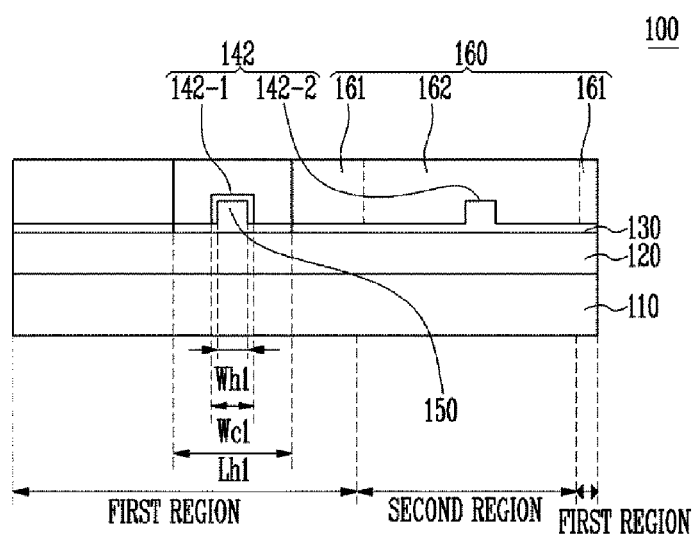

Next, referring to FIGS. 4A and 3B, FIG. 4A is a top plan view illustrating the ring resonator among the optical devices based on the optical waveguide according to the exemplary embodiment of the present invention, and FIG. 4B is a cross-sectional view taken along dotted line I-I' of FIG. 4A.

Contents of FIGS. 4A and 4B are the same as those described with reference to FIGS. 2A and 2B, except for contents to be described below.

The wavelength adjusting unit 150 may include a heater.

The core layer 150 may be positioned on the substrate 110. That is, the heater 150 may be positioned in the first region between the BOX 120 and the ring waveguide 142-1 passing through the first region.

Further, the heater 150 may be positioned on an upper surface of the BOX 120, and an upper surface of the heater 150 may be positioned to be adjacent or connected to a lower surface of the ring waveguide 142-1 passing through the first region.

Further, the heater 150 may have a cross-section shaped like a tappet having a width (Lh1) of a lower surface larger than a width (Wh1) of an upper surface.

Further, the width (Wh1) of the upper surface of the heater 150 may be smaller than the width (Wc1) of the ring waveguide 142. Further, the width (Lh1) of the lower surface of the heater 150 may be adjusted.

That is, in the optical waveguide according to the exemplary embodiment of the present invention, it is possible to adjust a wavelength error due to a manufacturing process deviation of the optical waveguide by adjusting the widths of the upper surface and the lower surface of the heater.

FIGS. 5 and 6 are diagrams illustrating a Mach-Zehnder Interferometer (MZI) among optical devices based on the optical waveguide according to the exemplary embodiment of the present invention.

Referring to FIGS. 5 to 6, an MZI 200 among optical devices based on the optical waveguide according to the exemplary embodiment of the present invention may include a core layer 240, a wavelength adjusting unit 250, and a clad layer 260.

A substrate 210, a BOX 220, and a slab waveguide 230 may be understood in association with the substrate 10, the BOX 20, and the slab waveguide 30 of the optical waveguide 1 aforementioned with reference to FIG. 1, respectively, so that a detailed description thereof will be omitted.

The core layer 240 may be positioned on the substrate 210. For example, the core layer 240 may be positioned between the substrate 210 and the clad layer 260. For another example, the core layer 240 may be positioned between the BOX 220 and the clad layer 260.

Further, the core layer 240 may include an optical distribution waveguide 241, a plurality of arm waveguides 242, and an optical combination waveguide 243 positioned in a first region and a second region.

Here, the plurality of arm waveguides 242 may be three or more, but may include two arm waveguides, that is, the first arm waveguide 242a and the second arm waveguide 242b, as illustrated in the drawing.

Accordingly, for simplicity of the description, it is described based on a fact that the plurality of arm waveguides 242 includes a first arm waveguide 242a and a second arm waveguide 242b.

Here, the first region and the second region may have the same size, but are not limited thereto, and may have different sizes.

For example, the first region may be smaller than the second region. For another example, the first region may be a region having a size corresponding to 25% or lower of the size of the entire regions including the first region and the second region.

Here, the optical distribution waveguide 241, the plurality of arm waveguides 242, and the optical combination waveguide 243 may be formed by pattering the core layer 240.

Here, the optical distribution waveguide 241, the plurality of arm waveguides 242, and the optical combination waveguide 243 may be optical paths through which an optical signal is propagated.

Here, as illustrated in the drawing, the first arm waveguide 242 242a and the second arm waveguide 242b may be connected between the optical distribution waveguide 241 through which the optical signal is distributed, and the optical combination waveguide 243 through which the optical signal is combined.

Here, the optical distribution waveguide 241 and the optical combination waveguide 243 may have the same shape, the same material, and the same size, but are not limited thereto, and may have different shapes, different materials, and different sizes.

For example, the optical distribution waveguide 241 and the optical combination waveguide 243 may have a shape of "Y" as illustrated in the drawing. For another example, the optical distribution waveguide 241 and the optical combination waveguide 243 may include a silicon material. That is, the optical distribution waveguide 241 and the optical combination waveguide 243 may have a silicon pattern.

Here, the first arm waveguide 242a and the second arm waveguide 242b may have the same shape, the same material, and the same size, but are not limited thereto, and may have different shapes, different materials, and different sizes.

For example, the first arm waveguide 242a and the second arm waveguide 242b may include a straight shape as illustrated in the drawing. For another example, the first arm waveguide 242a and the second arm waveguide 242b may include a silicon material. That is, the first arm waveguide 242a and the second arm waveguide 242b may have a silicon pattern.

Here, as illustrated in the drawing, the first arm waveguide 242a may pass through the first region, and the second arm waveguide 242b may be positioned in the second region.

Further, the core layer 240 may include a silicon material having a positive TOC. Accordingly, the optical distribution waveguide 241, the plurality of arm waveguides 242, and the optical combination waveguide 243 formed by patterning the core layer 240 may have the silicon pattern.

Here, the TOC may represent a change in a refractive index according to a temperature.

The wavelength adjusting unit 250 may be positioned on the substrate 210. For example, the wavelength adjusting unit 250 may be positioned in the first region between the substrate 210 and the clad layer 260 to be described below. For example, the wavelength adjusting unit 250 may be positioned in the first region between the BOX 220 and the clad layer 260.

Further, the wavelength adjusting unit 250 may be connected to a power supply unit through a conduction line as illustrated in the drawing. Further, the wavelength adjusting unit 250 may receive electric energy from the power supply unit.

Here, the power supply unit may be understood in association with the power supply unit (not shown) of the optical waveguide 1 aforementioned with reference to FIG. 1, so that a detailed description thereof will be omitted.

Further, the wavelength adjusting unit 250 may adjust a wavelength of an optical signal propagated through the plurality of arm waveguides, that is, the first arm waveguide 242a, passing through the first region based on the received electric energy.

Particularly, the wavelength adjusting unit 250 may adjust a wavelength of an optical signal by using a thermo-optic effect.

That is, the wavelength adjusting unit 250 may generate heat based on the received electric energy, and provides the generated heat to the first arm waveguide 242a passing through the first region to adjust a wavelength of an optical signal propagated through the first arm waveguide 242a passing through the first region.

For example, the wavelength adjusting unit 250 may include a heater. Here, the heater may include a thin film heater or a micro heater. For another example, the wavelength adjusting unit 250 may include a heating line, a heating plate, or an electrode. For another example, the wavelength adjusting unit 250 is not limited to the aforementioned heater, heating line, heating plate, or electrode, and may include any device or circuit which may generate heat based on received electric energy, and provide the generated heat to the first arm waveguide 242a passing through the first region.

Further, the wavelength adjusting unit 250 may include a p-type silicon structure. Here, in the P-type silicon structure, a boron (B) element may be doped with high concentration of $2\times 10^{19}/cm^3$.

Further, the wavelength adjusting unit 250 may be positioned to be adjacent or connected to the first arm waveguide 242a passing through the first region. That is, the wavelength adjusting unit 250 may be positioned to be adjacent or connected to the arm waveguide 242a passing through the first region in up, down, left, and right directions based on the arm waveguide 242a passing through the first region.

For example, the wavelength adjusting unit 250 may be positioned to be adjacent or connected to the arm waveguide 242a passing through the first region on the same plane in up, down, left, and right directions based on the arm waveguide 242a passing through the first region. For another example, the wavelength adjusting unit 250 may be positioned to be adjacent or connected to the arm waveguide 242a passing through the first region on different planes in up and down directions based on the arm waveguide 242a passing through the first region.

Further, the wavelength adjusting unit 250 may be configured by one wavelength adjusting unit, but the present invention is not limited thereto, and the wavelength adjusting unit 150 may be configured by two or more wavelength adjusting units.

Here, the plurality of wavelength adjusting units 251 and 252 may have the same shape, the same material, and the same size, but are not limited thereto, and may have different shapes, different materials, and different sizes. For example, the shapes of the plurality of wavelength adjusting units 251 and 252 may include a cross-sectional shape of a quadrangle, a circle, an ellipse, or a polygon.

The clad layer 260 may be positioned on the substrate 210. That is, the clad layer 260 may cover the slab waveguide 230, the optical distribution waveguide 241, the plurality of arm waveguides 242, the optical combination waveguide 243, and the wavelength adjusting unit 250 positioned on the substrate 210.

Further, the clad layer 260 may include at least one of a material having a TOC with an opposite sign to that included in the core layer 240, and a material having a smaller TOC than that of a material included in the core layer 240.

That is, when the core layer 240 includes a silicon material having a positive TOC, the clad layer 260 may include at least one of a material having a negative TOC and a material having a smaller TOC than that of the silicon material.

Here, the material having the negative TOC may include a polymer material or an inorganic material, of which a refractive index is decreased as a temperature is increased contrary to the silicon material.

Here, the TOC of the silicon material may be $+0.00018/°$ C.

Particularly, the TOC of the polymer material or the inorganic material may be $-0.00005/°$ C. to $-0.0003°$ C.

Here, the polymer material and an inorganic material may be understood in association with the polymer material and the inorganic material of the optical waveguide 1 aforementioned with reference to FIG. 1, so that a detailed description thereof will be omitted.

Here, the material having the smaller TOC than that of the silicon material may include a silica material.

Particularly, the TOC of the silica material may be $+0.00001/°$ C.

Next, referring to FIGS. 5A and 5B, FIG. 5A is a top plan view illustrating an MZI among the optical devices based on the optical waveguide according to the exemplary embodiment of the present invention, and FIG. 5B is a cross-sectional view taken along dotted line I-I' of FIG. 5A.

A core layer 240 may include a plurality of arm waveguides 242.

The plurality of warm waveguides 242 may include a first arm waveguide 242a and a second arm waveguide 242b.

The first arm waveguide 242a may be positioned over a first region and a second region. Further, the second arm waveguide 242b may be positioned in the second region.

Here, the first region may be a region having a size corresponding to 25% or lower of the size of the entire regions including the first region and the second region.

Here, the second region may be the remaining region except for the first region.

Further, the first arm waveguide 242a and the second arm waveguide 242b may be a silicon pattern including a silicon material having a positive TOC.

Further, a thickness (Hc2) of the arm waveguides 242 and a width (Wc2) of the arm waveguides 242 may be adjusted.

Here, as illustrated in the drawing, the widths (Wc2) of the first arm waveguide 242a and the second warm waveguide 242b may have the same sizes.

Here, the thicknesses (Hc2) of the arm waveguides 242 may be 150 nm to 400 nm. Here, the widths (Wc2) of the arm waveguides 242 may be 250 nm to 500 nm. That is, in the MZI according to the exemplary embodiment of the present invention, it is possible to reduce TDWS of the MZI by changing the thicknesses and the widths of the arm waveguides. Here, the TDWS may mean a change of a center wavelength according to a temperature.

A slab waveguide 230 may be positioned under the first arm waveguide 242a and the second arm waveguide 242b. Further, a thickness (Hs2) of the slab waveguide 230 may be adjusted. Here, the thickness (Hs2) of the slab waveguide 230 may be 0 nm to 100 nm. That is, in the MZI according to the exemplary embodiment of the present invention, it is possible to reduce TDWS of the MZI by changing the thickness of the slab waveguide.

A wavelength adjusting unit 250 may include a heater. The heater may include a first heater 251 and a second heater 252.

Here, the first heater 251 and the second heater 252 may be positioned on the substrate 210. That is, the first heater 251 and the second heater 252 may be positioned in the first region between a BOX 220 and a clad layer 260.

Here, the first heater 251 may be adjacently positioned to the first arm waveguide 242a passing through the first region on the same plane in a left direction based on the first arm waveguide 242a passing through the first region.

Here, the second heater 252 may be adjacently positioned to the first arm waveguide 242a passing through the first region on the same plane in a right direction based on the first arm waveguide 242a passing through the first region.

Further, an interval (Wg2) between the first heater 251 and the first arm waveguide 242a passing through the first region and an interval (Wg2) between the second heater 252 and the first arm waveguide 242a passing through the first region may be adjusted. Here, each of an interval (Wg2) between the first heater 251 and the first arm waveguide 242a passing through the first region and an interval (Wg2) between the second heater 252 and the first arm waveguide 242a passing through the first region may be 400 nm to 1000 nm.

Further, a width (Wh2) of the first heater 251 and a width (Wh2) of the second heater 252 may be adjusted. Here, the width (Wh2) of the first heater 251 and the width (Wh2) of the second heater 252 may be 300 nm to 3000 nm.

That is, in the MZI according to the exemplary embodiment of the present invention, it is possible to adjust a wavelength error due to a manufacturing process deviation of the MZI by changing the interval between the first heater and the first arm waveguide passing through the first region, the interval between the second heater and the first arm waveguide passing through the first region, the width of the first heater, and the width of the second heater.

Further, the clad layer 260 may include a first clad layer 261 and a second clad layer 262.

Here, the first clad layer 261 has a size corresponding to that of the first region, and may cover the slab waveguide 230, the first arm waveguide 242a, the first heater 251, and the second heater 252 positioned in the first region. Further, the first clad layer 261 may include a silica material having a smaller TOC than that of the silicon material.

Here, the second clad layer 262 has a size corresponding to that of the second region, and may cover the slab waveguide 230, the optical distribution waveguide 241, the first arm waveguide 242a, the second arm waveguide 242b, and the optical combination waveguide 243 positioned in the second region. Further, the second clad layer 262 may include a polymer material or an inorganic material having a negative TOC, in which a refractive index is decreased as a temperature is increased contrary to the silicon material.

Figure 6A:
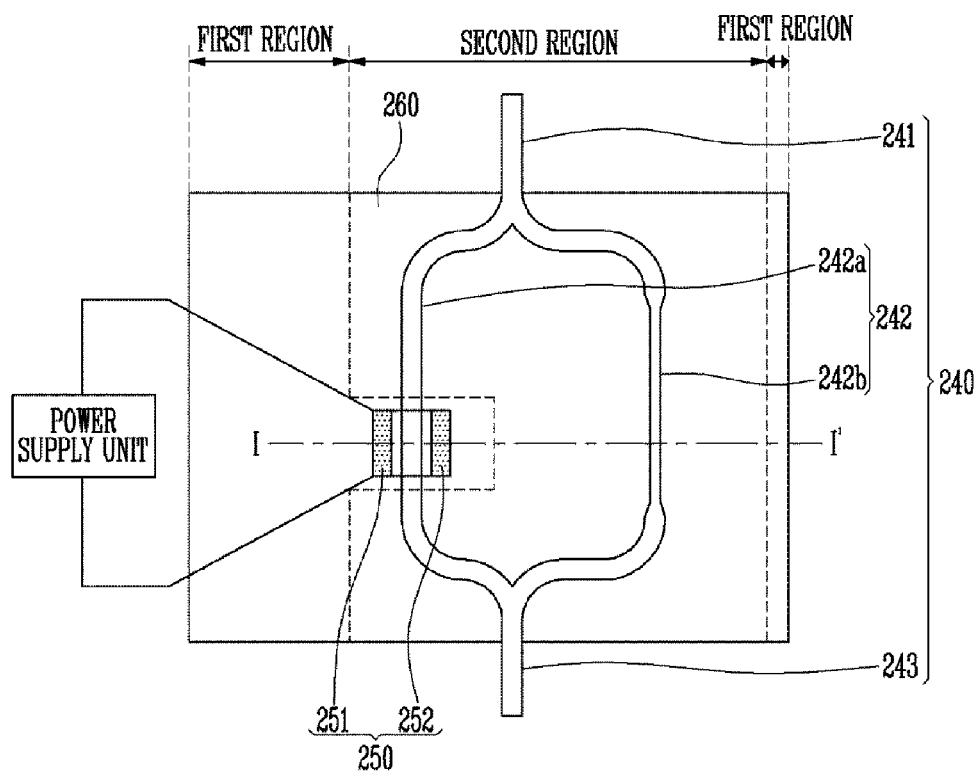
Figure 6B:
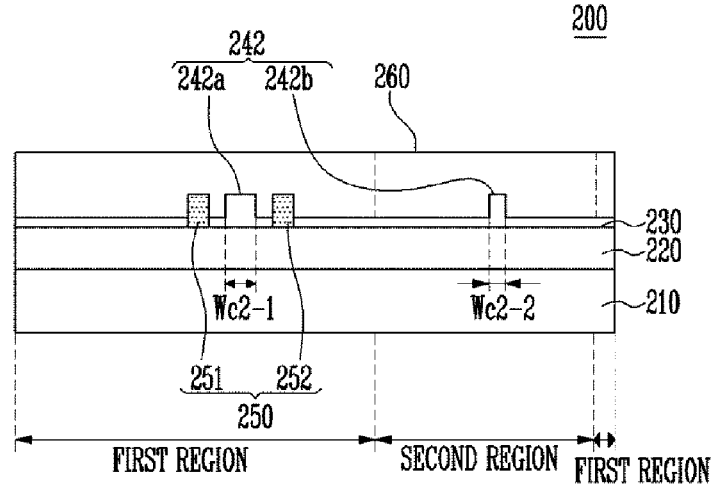

Next, referring to FIGS. 6A and 6B, FIG. 6A is a top plan view illustrating an MZI among the optical devices based on the optical waveguide according to another exemplary embodiment of the present invention, and FIG. 6B is a cross-sectional view taken along dotted line I-I' of FIG. 6A.

Contents of FIGS. 6A and 6B are the same as those described with reference to FIGS. 5A and 5B, except for contents to be described below.

A clad layer 260 may include a material having a smaller TOC than that of a material included in a core layer 240.

That is, when the core layer 240 includes a silicon material having a positive TOC, the clad layer 260 may include a material having a smaller TOC than that of the silicon material.

Here, the material having the smaller TOC than that of the silicon material may include a silica material.

In this case, a width (Wc2-1) of a first arm waveguide 242a and a width (Wc2-2) of a second arm waveguide 242b may have different sizes. That is, even though the MZI according to the exemplary embodiment of the present invention is clad with a material capable of offsetting the TOC of the core layer, that is, a material having a negative TOC when the core layer is a silicon material, it is possible to decrease TDWS of the MZI by differently changing the widths of the first arm waveguide and the second arm waveguide.

For example, a width (Wc2-1) of a first arm waveguide 242a may be larger than a width (Wc2-2) of a second arm waveguide 242b. For another example, the width (Wc2-1) of the first arm waveguide 242a may be smaller than the width (Wc2-2) of the second arm waveguide 242b.

As described above, the embodiment has been disclosed in the drawings and the specification. The specific terms used herein are for purposes of illustration, and do not limit the scope of the present invention defined in the claims. Accordingly, those skilled in the art will appreciate that various modifications and another equivalent example may be made without departing from the scope and spirit of the present disclosure. Therefore, the sole technical protection scope of the present invention will be defined by the technical spirit of the accompanying claims.

What is claimed is:

1. An optical device based on an optical waveguide, comprising:
   a substrate; and
   a Mach-Zehnder Interferometer (MZI) positioned on the substrate,
   wherein the MZI includes:
   a clad layer positioned on the substrate;
   a core layer positioned between the substrate and the clad layer, and including a first arm waveguide positioned in a first region and a second arm waveguide positioned in a second region; and
   a wavelength adjusting unit positioned in the first region between the substrate and the clad layer, and configured to adjust a wavelength of an optical signal propagated through the first arm waveguide passing through the first region based on received electric energy,
   wherein the clad layer includes at least one of a material having a thermo-optic coefficient (TOC) with an opposite sign to that of a material included in the core layer, and a material having a smaller TOC than that of the material included in the core layer,
   wherein the core layer includes a silicon material having a positive TOC, and
   wherein the clad layer includes:
   a first clad layer positioned in the first region, and including a material having a smaller TOC than that of the silicon material included in the core layer; and
   a second clad layer positioned in the second region and including a material having a negative TOC.

2. The optical device of claim 1, wherein the first region is smaller than the second region.

3. The optical device of claim 1, wherein the wavelength adjusting unit generates heat based on the received electric energy, and provides the generated heat to the first arm waveguide passing through the first region to adjust a wavelength of an optical signal propagated through the first arm waveguide passing through the first region.

4. The optical device of claim 1, wherein the MZI further includes a slab waveguide positioned between the substrate and the core layer.

5. An optical device based on an optical waveguide, comprising:
   a substrate; and
   a Mach-Zehnder Interferometer (MZI) positioned on the substrate,
   wherein the MZI includes:
   a clad layer positioned on the substrate;
   a core layer positioned between the substrate and the clad layer, and including a first arm waveguide positioned in a first region and a second arm waveguide positioned in a second region; and
   a wavelength adjusting unit positioned in the first region between the substrate and the clad layer, and configured to adjust a wavelength of an optical signal propagated through the first arm waveguide passing through the first region based on received electric energy,
   wherein the clad layer positioned in the first region is formed of a same material as the clad layer in the second region, and said same material includes a material having a thermo-optic coefficient (TOC) with a same sign to but smaller than that of a material included in the core layer, a width of the first arm waveguide passing through the first region is different from a width of the second arm waveguide positioned in the second region.

* * * * *